Figure 1:
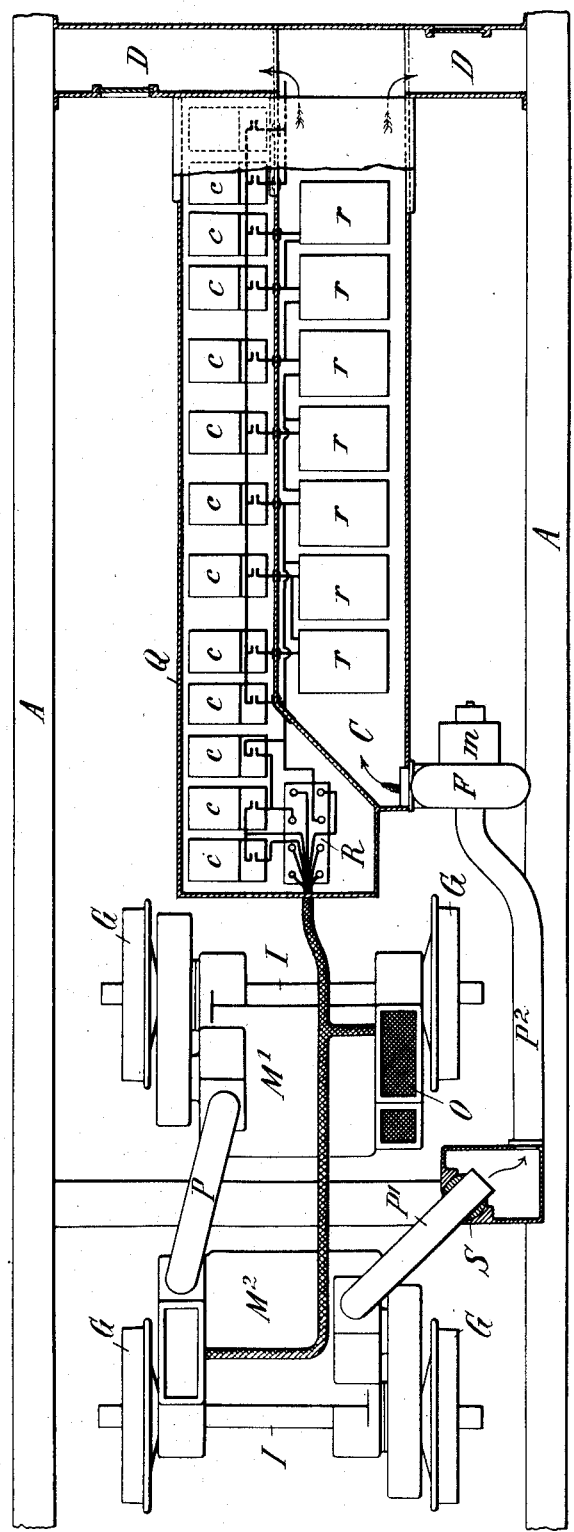

No. 811,967. PATENTED FEB. 6, 1906.
L. B. STILLWELL.
ELECTRIC CAR.
APPLICATION FILED JULY 29, 1904.

7 SHEETS—SHEET 1.

Witnesses:
Inventor:
Lewis B. Stillwell
by Gifford & Bull Attys.

No. 811,967. PATENTED FEB. 6, 1906.
L. B. STILLWELL.
ELECTRIC CAR.
APPLICATION FILED JULY 29, 1904.

7 SHEETS—SHEET 2.

Witnesses:
Walter C. Pauling
Chas. J. Rathjen

Inventor:
Lewis B. Stillwell
by Gifford & Price
Attys

No. 811,967. PATENTED FEB. 6, 1906.
L. B. STILLWELL.
ELECTRIC CAR.
APPLICATION FILED JULY 29, 1904.

7 SHEETS—SHEET 3.

Witnesses: Inventor:
Lewis B. Stillwell
by Gifford Snell Att'ys.

No. 811,967. PATENTED FEB. 6, 1906.
L. B. STILLWELL.
ELECTRIC CAR.
APPLICATION FILED JULY 29, 1904.
7 SHEETS—SHEET 4.
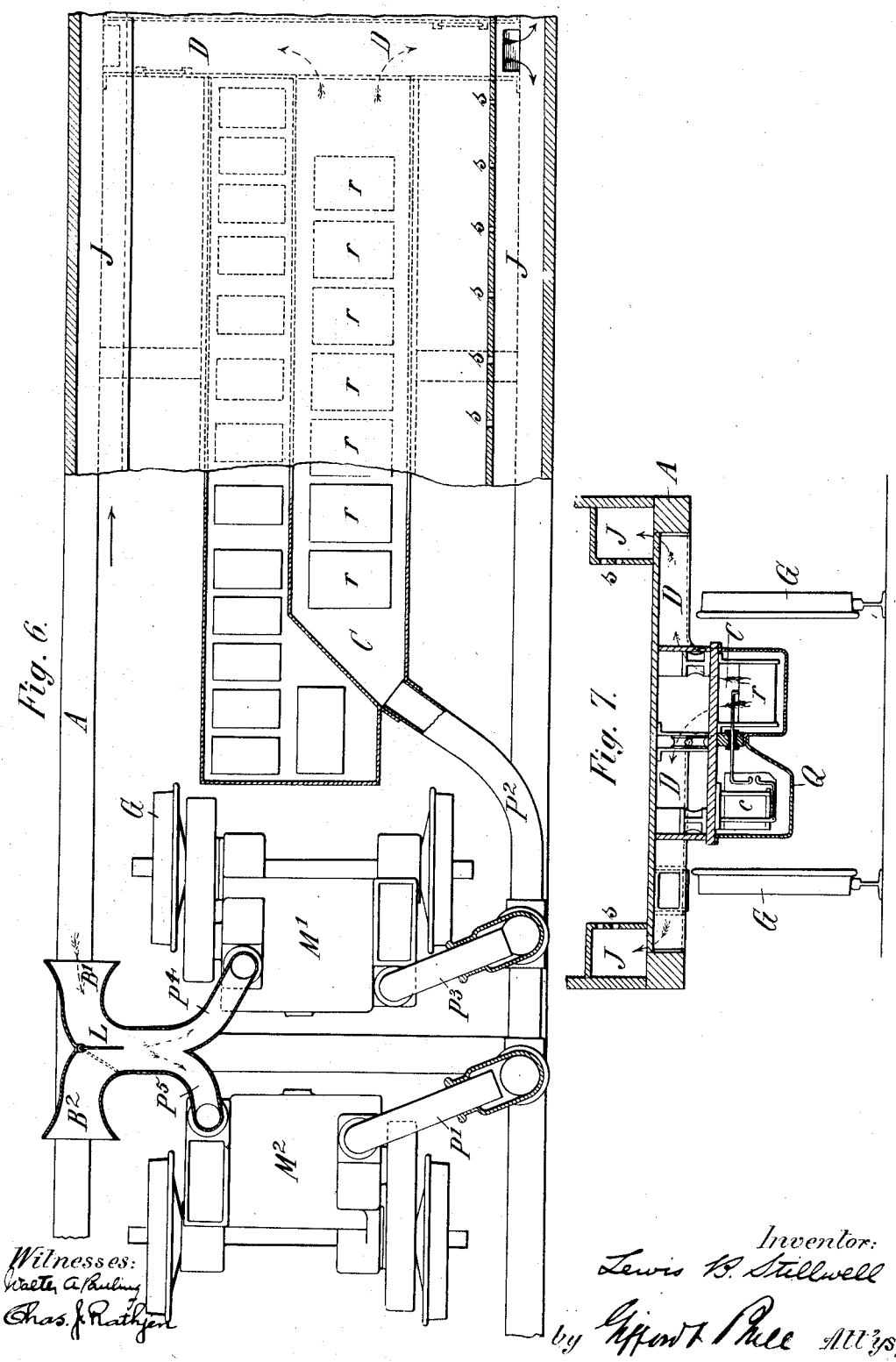

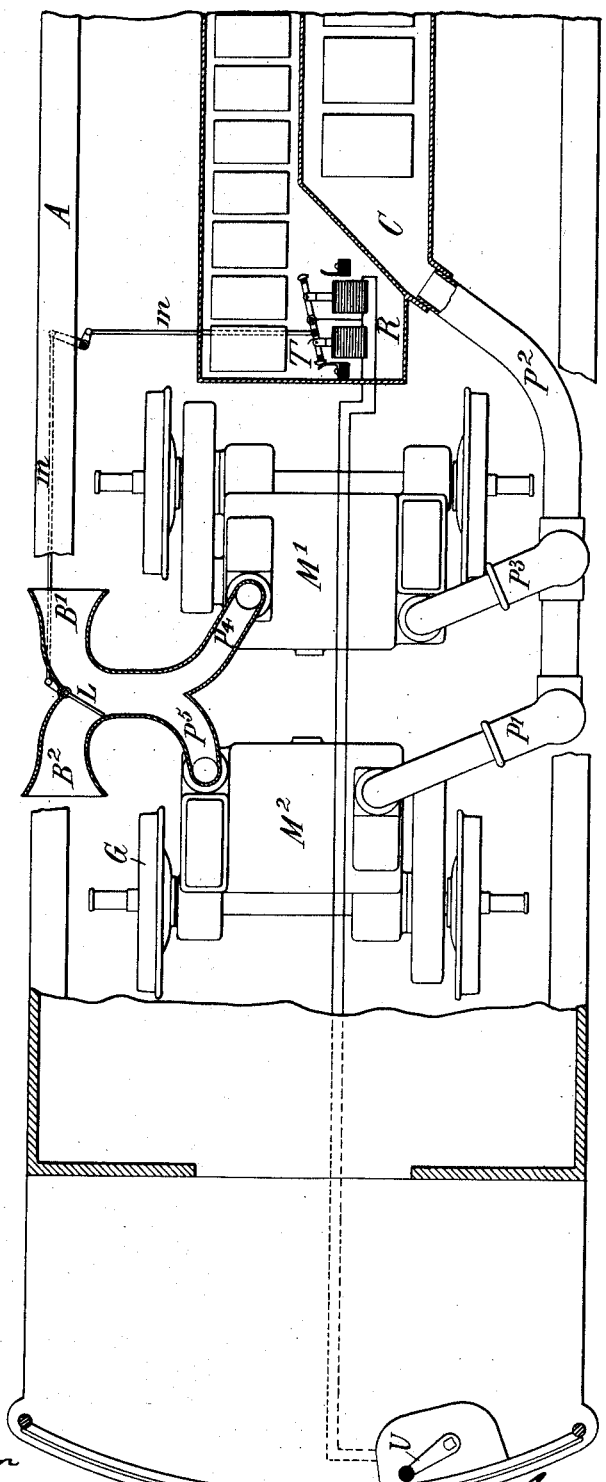

No. 811,967. PATENTED FEB. 6, 1906.
L. B. STILLWELL.
ELECTRIC CAR.
APPLICATION FILED JULY 29, 1904.

7 SHEETS—SHEET 6.

Witnesses:

Inventor
Lewis B. Stillwell
by Gifford & Bull Att'ys.

No. 811,967.  PATENTED FEB. 6, 1906.
L. B. STILLWELL.
ELECTRIC CAR.
APPLICATION FILED JULY 29, 1904.

7 SHEETS—SHEET 7.

Witnesses:

Inventor:
Lewis B. Stillwell
by Gifford & Price Att'ys

UNITED STATES PATENT OFFICE.

LEWIS B. STILLWELL, OF LAKEWOOD, NEW JERSEY.

ELECTRIC CAR.

No. 811,967.          Specification of Letters Patent.          Patented Feb. 6, 1906.

Application filed July 29, 1904. Serial No. 218,625.

*To all whom it may concern:*

Be it known that I, LEWIS B. STILLWELL, a citizen of the United States, residing at Lakewood, in the county of Ocean and State of New Jersey, have invented certain new and useful Improvements in Electric Cars, of which the following is a specification.

My invention relates to electrically-propelled vehicles; and it consists in certain novel parts and combinations of parts pointed out in the claims concluding this specification.

In the operation of electrically-driven cars it is desirable to reduce the weight of the equipment—such as motors, rheostats, &c.—as much as possible. The weight of this apparatus may be, as is well known, reduced if the parts be artificially cooled. Reduction of weight is important, not only because it reduces the cost of the equipment but because in some instances the strength of elevated structures or bridges is such that every pound of weight that can be taken from the rolling-stock is of material advantage. The reduction in the weight of the electrical apparatus is further important in that in all cases it will result in a saving in power, and hence a saving in the cost of operation. In many cases this will amount to a very considerable amount annually. In cold weather the cars must be heated, and the heat given off by the electrical apparatus would generally be sufficient to maintain the interior of the car at the desired temperature; but if it be not sufficient in severely cold weather yet whatever heat is thus generated and applied effects a saving in power. In some plants the heater-load at times constitutes from twenty to thirty per cent. of the full load on the system. So much heat as is given off by the electrical apparatus and conveyed into the car reduces the power-house load and increases its capacity for car traffic. In most electric-railway systems the effect of the iron-dust and other foreign matter drawn into the motor is very injurious to them and seriously shortens the life of the insulation. It is evident that in my invention the air that is supplied to the motors can be drawn from any point desired remote from the iron-dust and other foreign materials. It is desirable to protect the woodwork of car-bodies against the possibility of fire, which may originate in the electrical apparatus or conductors. I may attain all these objects in the structure hereinafter described. By inclosing the electrical apparatus in metallic or other fireproof boxes I may diminish the danger from fire. By establishing rapid circulation of air through these chambers I may maintain the electrical apparatus at a lower temperature, thereby increasing its capacity and efficiency, and by utilizing the heat thus given off in heating the cars I may effect a saving in proportion to the amount of heat so utilized. Furthermore, when the heat is not needed to warm the cars the apparatus described may be utilized to ventilate the cars by reversing the direction of the draft through the boxes and passages, the heat being discharged into the open air. Besides the ventilation of the cars even in winter is improved, because instead of reheating the air already in the car, as is the practice at the present time, pure heated air may be brought in from the exterior and the exhausted air expelled by the pressure thus created.

Figure 2:
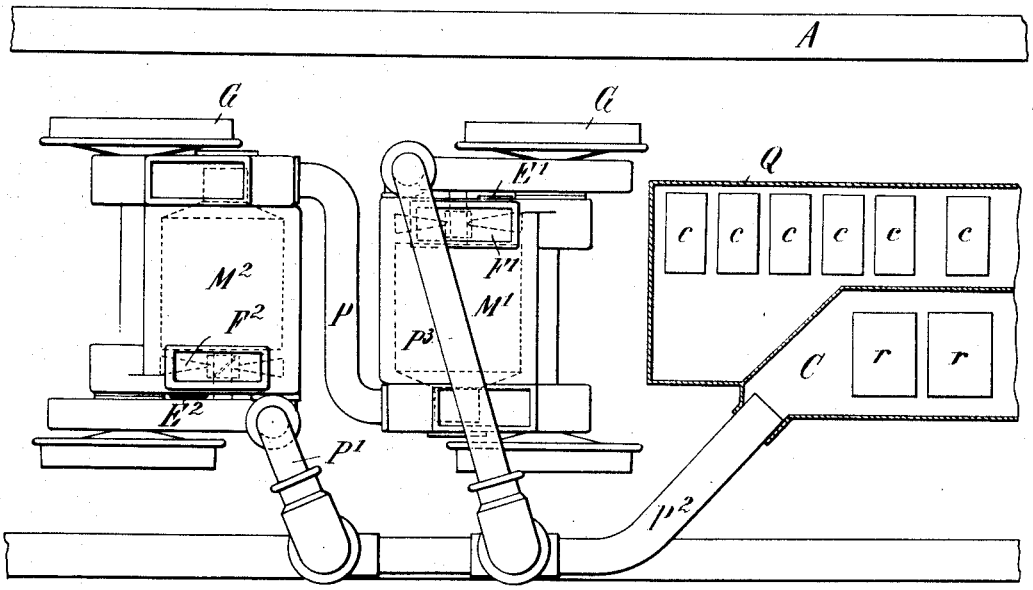
Figure 3:
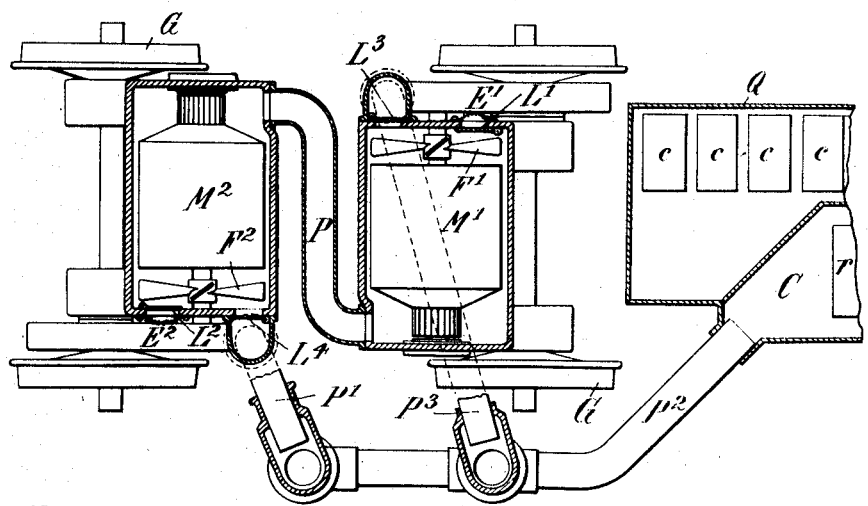
Figure 4:
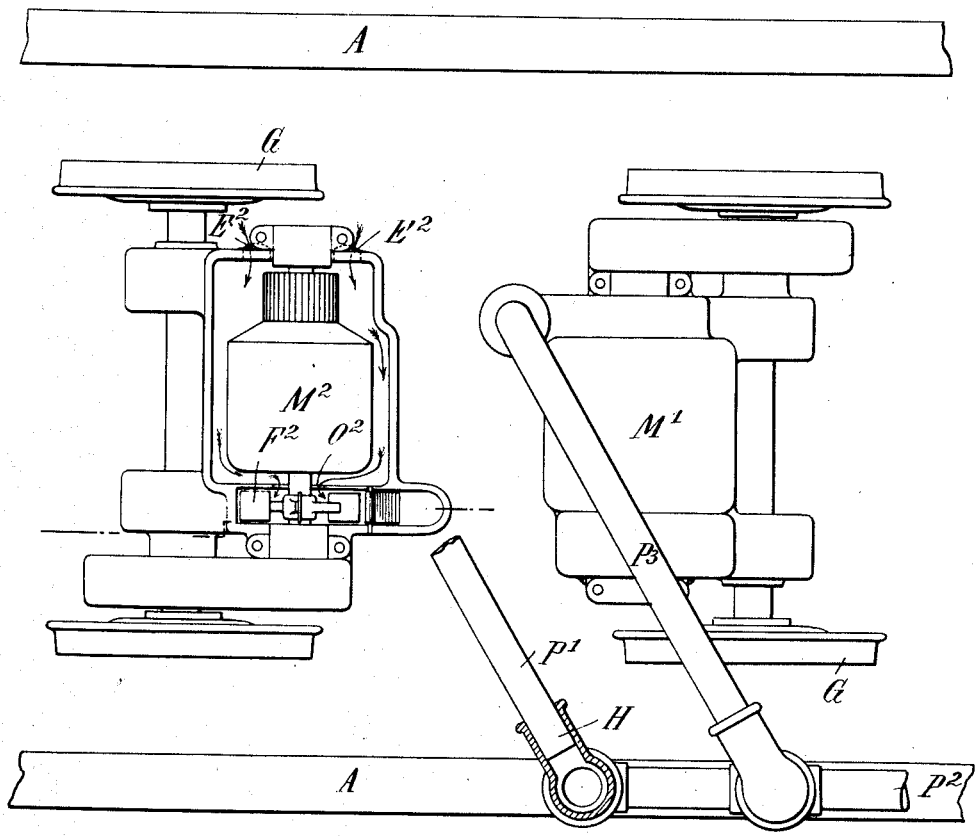
Figure 5:
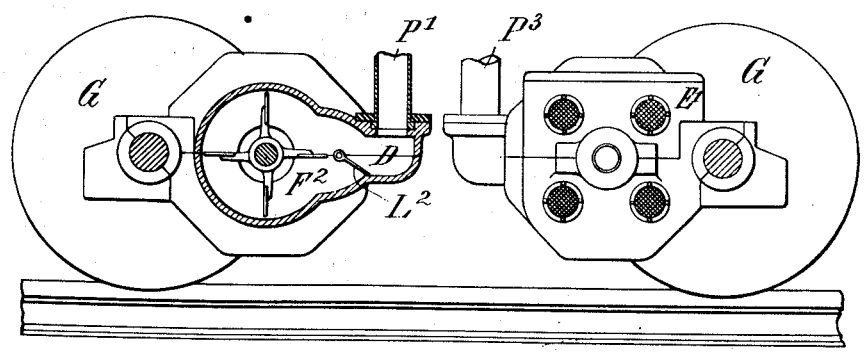
Figure 9:
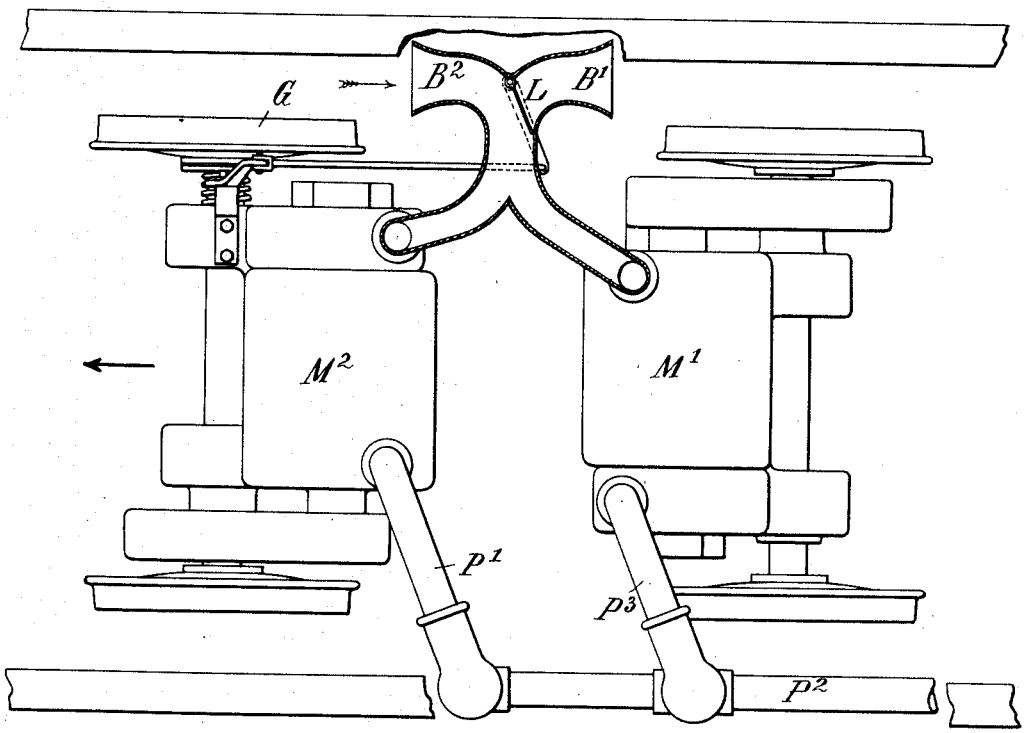
Figure 10:
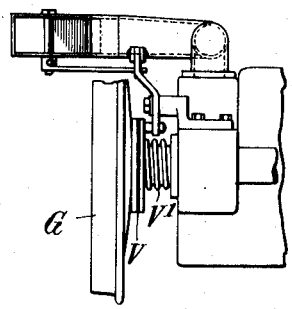
Figure 11:
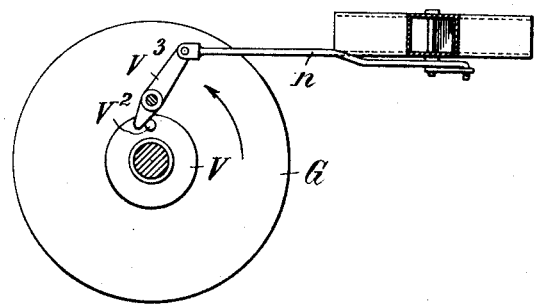
Figure 12:
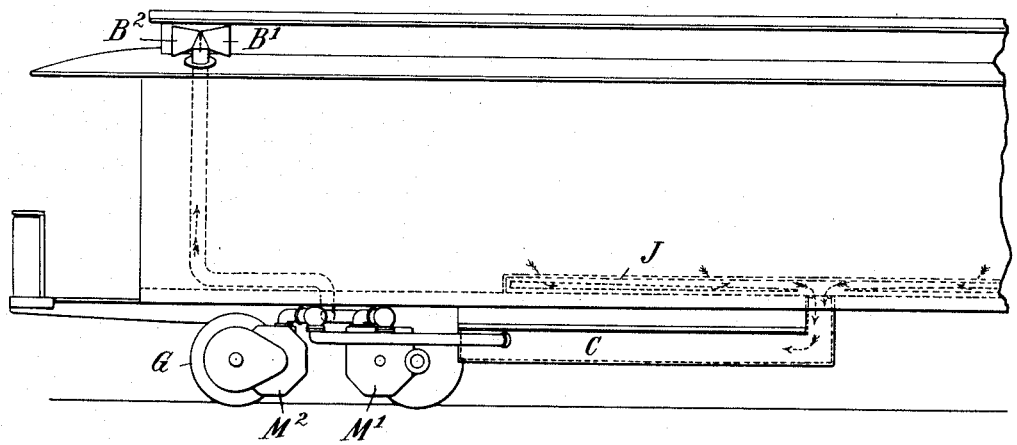
Figure 13:
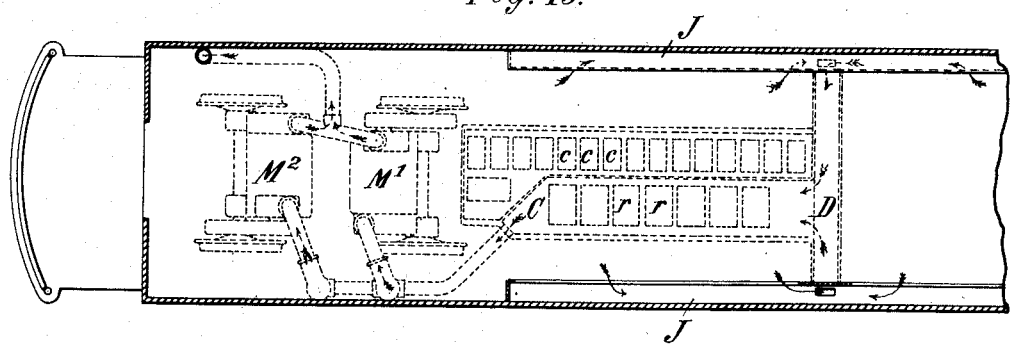
Figure 14:
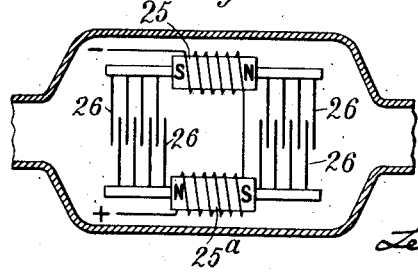

In the accompanying drawings, Figure 1 is a longitudinal view, partly in section, of the running-gear of a car and the motors and controlling devices therefor. Fig. 2 is a similar view of a modified form of the apparatus shown in Fig. 1. Fig. 3 is a sectional view of the apparatus shown in Fig. 2. Fig. 4 shows another modified form of the apparatus illustrated in Fig. 1. Fig. 5 is in part a sectional view and in part a side view of the structure shown in Fig. 4. Fig. 6 shows another modification of the apparatus shown in Fig. 1. Fig. 7 is a sectional view of the apparatus shown in Fig. 6. Figs. 8 and 9 show another modified form of the apparatus. Figs. 10 and 11 are detail views of the structure shown in Fig. 9. Fig. 12 is a side view of a car with my invention applied thereto, and Fig. 13 is a top view of the electrical apparatus attached to the car shown in Fig. 12. Fig. 14 is a detail view of an electric screen.

Similar characters of reference indicate the same or corresponding parts in the several figures.

I will now describe the various structures shown in the accompanying drawings, which drawings illustrate forms of my invention at present preferred by me; but it will be understood that various modifications and changes may be made without departing from the spirit of my invention and without exceeding the scope of the claims concluding this specification.

Referring to Fig. 1, A A designate the body or sills of a car. G G are the wheels thereof.

I I are the axles to which the motors M' and M² are geared. F is a fan or blower of suitable construction, and $m$ is a motor by which said fan is operated. M' M² are motors inclosed in suitable iron cases. When the fan F is in action, air is drawn through the opening O into the casing of motor M', thence through pipe P and through the casing of motor M², thence through pipes P' and P² into the chamber C, containing the rheostats $r, r, r$, &c., and thence through passages D D into the body of the car, where it is distributed to effect the heating thereof. S is a ball-and-socket and sliding joint for pipe P' to permit of independent motion between the motor carried on the running-gear and the connection with the frame of the car. $c\ c\ c\ c$, &c., are contractors or controllers, which are also shown as inclosed in a casing Q. It will be observed that the air passes first through the casing of motor M' and subsequently through the casing of motor M², which motors will therefore not operate at the same temperatures. Instead of thus arranging them in series, so to speak, they may be arranged in parallel, as shown in other figures of the drawings, which will result in maintaining them at equal temperatures.

Referring to Figs. 2 and 3, these show a construction in which the fans F' F² are carried by or geared to the motor-shafts instead of being operated by an independent motor, as in the case of Fig. 1 already described. E' and E² are openings in the motor-cases through which the air enters, these openings being provided with check-valves L' and L². P' and P³ are pipes leading from the motor-cases to the pipe P², the pipes being provided with check-valves L⁴ and L³, respectively. Assuming the car to be moving toward the right hand, the partial vacuum produced within the case of motor M² will cause the valve L² to open, admitting air, and the valve L⁴, communicating with pipe P', to close. The air will then be forced through pipe P and through the case of motor M', closing check-valve L' and opening check-valve L³. It thence flows through the pipes P³ and P² to the chamber C as before. When the car moves in the reverse direction or toward the left hand, check-valves L' will open and L³ close, the air passing through pipe P into the casing of motor M², closing valve L² and opening valve L⁴, which permits it to pass through the pipes P' and P² to the chamber C and thence to the car.

Referring to Figs. 4 and 5, these show a different form of fan, which is likewise mounted on the motor-shaft and may be included in the motor-casing or may be external thereto. The wing-fan employed is shown in vertical section in Fig. 5. In this case air enters at the openings E², passes through the motor-casing, and is discharged, by means of pipes P' and P², into the chamber C, containing the rheostats. L² is a wing-valve which is counterbalanced, so that it will readily and automatically assume the proper position to insure the flow of air irrespective of the direction of rotation of the fan. Thus when the fan is rotating clockwise it will assume the position shown in Fig. 5, whereas when it is rotating anticlockwise it will assume an elevated position. This wing-valve can of course be operated mechanically or electrically, instead of its position being determined by the flow of air. In this case the motors are shown arranged in parallel, although they of course might be arranged in series, as shown in the other figures. H is a swivel-joint to permit relative motion between the motors and trucks and the car-body.

In Fig. 6 the flow of air is effected by a ventilating-cowl instead of by a fan or blower. In this arrangement the air is scooped in by the cowl B' or B², depending upon the direction in which the car is moving. L is a balanced wing-valve, which when the car is moving toward the right hand automatically assumes the position shown in dotted lines and when the car is moving toward the left hand automatically assumes the opposite position. The air thus scooped in passes simultaneously through pipes P⁴ and P⁵, motor-cases M' and M², pipes P³ and P' to the common discharge-pipe P², and thence to the chamber C. The ventilating-cowl can be placed in any desired position.

Fig. 7 is a cross-section showing the distribution of the heated air to the interior of the car. The passage D communicates through suitable openings with longitudinal passages J J, (placed on the sides of the car, preferably under the seats,) from which the heated air issues through the perforations or openings $s\ s$, these openings being suitably proportioned to secure as far as may be a uniform distribution of heat.

In Fig. 8 I have shown electrical mechanism for positively operating the wing-valve L, the same consisting of an electromagnetic device T of any suitable construction controlled by the handle U and connected with the valve by a bell-crank lever and rods $m\ m$.

Figs. 9, 10, and 11 show a different device for controlling the position of the valve L. This consists of a block V, loosely carried on the axle-shaft and pressed frictionally against the car-wheel, or a disk carried thereby, by the coiled spring V'. The block V carries a pin V², in the path of which is one end of a lever V³, connected by rod $n$ with the valve L. When the car moves in one direction, the pin V² strikes the tail of lever V³ on one side and when it moves in the opposite direction strikes it on the other side, thus automatically and positively shifting the position of the valve L each time the car reverses its direction.

Figs. 12 and 13 show the device of Fig. 6 mounted on a car, the ventilating-cowls being arranged on the roof. As shown, the valve is adjusted so as to exhaust the air from the car, though it is apparent from the appliances previously explained that the valve can be arranged to force air through the motors and electrical apparatus into the car. As illustrated, the air is drawn from the car through the rheostats r r r, &c., then through the shells of the motors M' and M², and is discharged through the ventilating-cowl B' or B², depending upon the direction in which the car is moving. When this arrangement is used either to force air into the car or to exhaust the air from the car, it is evident that the iron-dust and other foreign material cannot reach the interior of the motor or affect the other electrical apparatus. The other constructions previously shown can be arranged to accomplish substantially the same results.

Instead of taking the air used in ventilating the motor from a point so remote from the brake-shoes as the roof of the car it may be taken from under the car at a point sufficiently remote from the brake-shoes to very considerably diminish the amount of iron-dust contained in the ventilating-draft. In order to reduce still further the amount of iron-dust in the ventilating-draft, I propose, when desired, to use some means for eliminating the iron-dust or a considerable part of it—such, for example, as a settling-chamber or a magnetic screen. Such a screen I have shown diagrammatically in Fig. 14, in which 25 and 25ª are electromagnets, and 26 26 26 26 polar extensions of the same, forming a magnetic screen to collect and hold the iron-dust passing through the chamber containing it. Such a screen may be used in connection with any of the constructions heretofore described, as will be readily understood.

Having thus described several structures which embody my invention in forms at present preferred by me, what I claim, and desire to secure by Letters Patent, is—

1. In electric cars the combination of a motor and rheostats, chambers containing said elements, means for causing a current of air at substantially atmospheric pressure to flow through said chambers and for conveying the air so heated to the interior of the car.

2. In electric cars the combination of a chamber beneath the floor of the car, a heat-generating element of the electrical motive-power equipment of said car contained in said chamber, a fan, or equivalent device, for causing a current of air at substantially atmospheric pressure to flow through said chamber, and a conduit connecting said chamber with the interior of said car.

3. In electric cars the combination of a chamber, a heat-generating element of the electrical motive-power equipment of said car contained in said chamber, a fan rotated by the motor propelling said car, means for automatically maintaining the direction of the moving air into or out of the car constant irrespective of the direction in which the motor rotates, and a conduit connecting said chamber with the interior of said car.

4. In electric cars the combination of a chamber, a heat-generating element of the electrical motive-power equipment of said car contained in said chamber, an entrance-passage to said chamber provided with a valve, means for automatically shifting said valve as the direction of the movement of the car is reversed, and means for conveying the air thus heated to the interior of the car.

5. In electric cars, the combination of a chamber, a heat-generating element of the electric motive-power equipment of said car contained in said chamber, an entrance-passage to said chamber provided with a valve and means for shifting said valve as the direction of the movement of the car is reversed, said means consisting of electrically-actuated mechanism interlocked with the electric circuits by which the car movements are determined.

6. In electric cars, the combination of a chamber, a motor contained in said chamber, means for causing a current of air to circulate through said chamber and means for eliminating from said current iron-dust before it is introduced into said chamber.

7. In electric cars, the combination of a chamber, a motor contained in said chamber, means for causing a current of air to circulate through said chamber, and a magnetic screen past which the current circulates before reaching said chamber.

In testimony whereof I have signed my name to this specification in the presence of two subscribing witnesses.

LEWIS B. STILLWELL.

Witnesses:
W. EVERITT RUNDLE,
HENRY ST. CLAIR PUTNAM.